Sept. 19, 1939.   C. E. BOWERS   2,173,546
METAL RECOVERING MEANS AND METHOD
Filed July 3, 1936   3 Sheets-Sheet 1
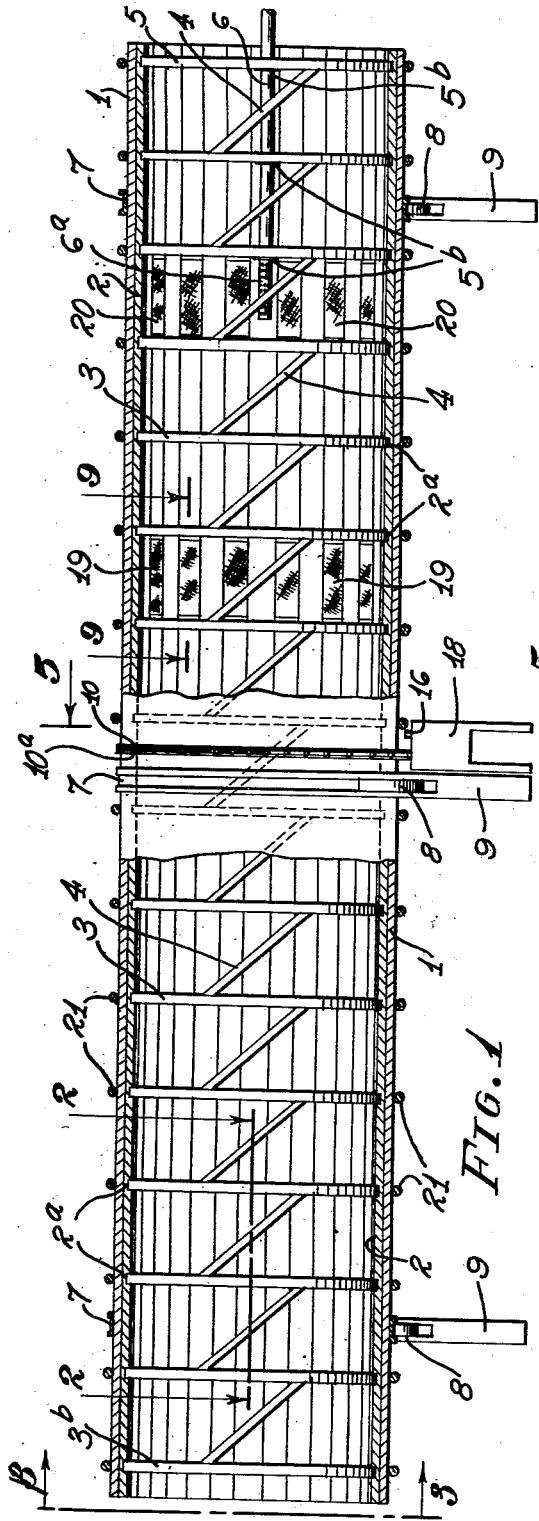
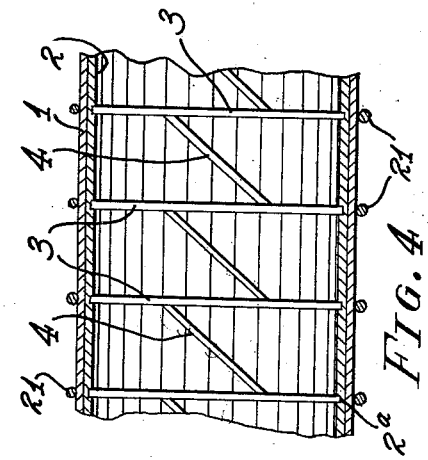
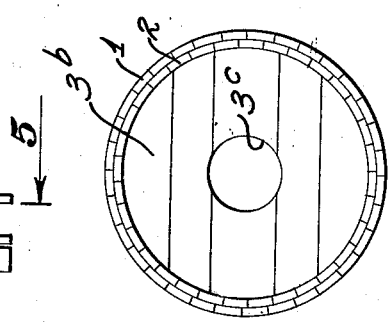
INVENTOR
Claude E. Bowers
BY
A. B. Bowman
ATTORNEY Sept. 19, 1939.   C. E. BOWERS   2,173,546
METAL RECOVERING MEANS AND METHOD
Filed July 3, 1936   3 Sheets-Sheet 2
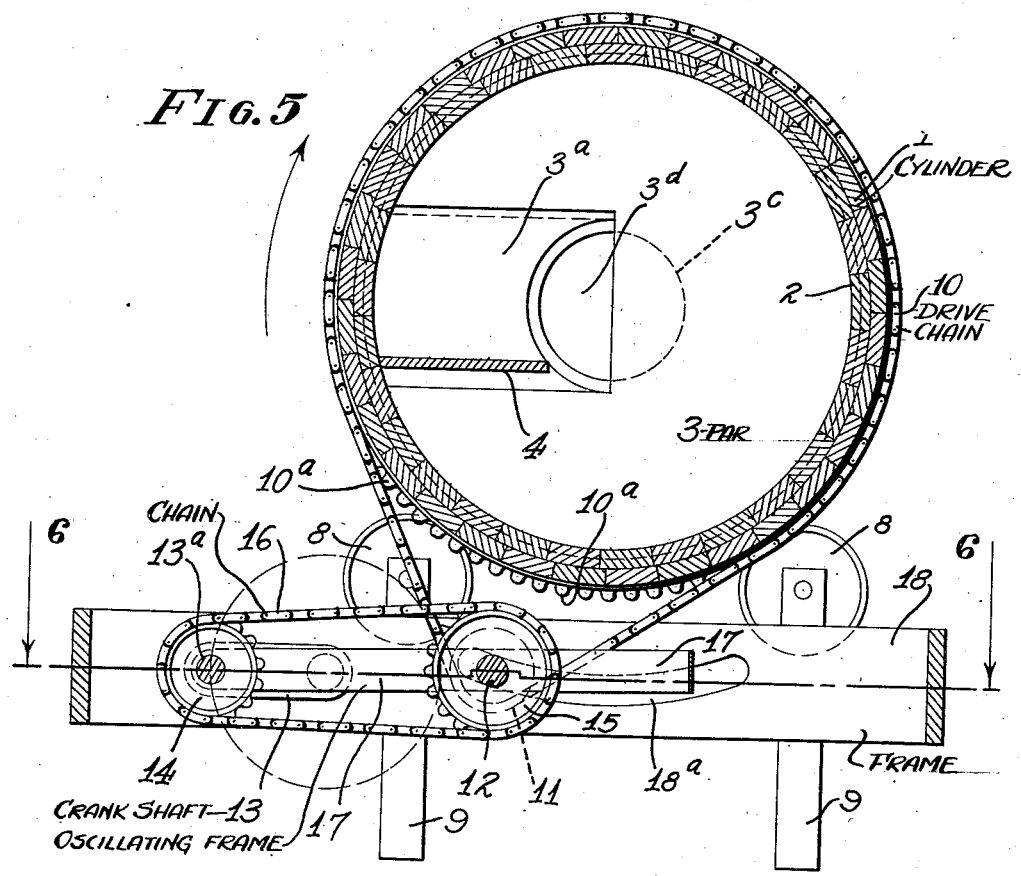
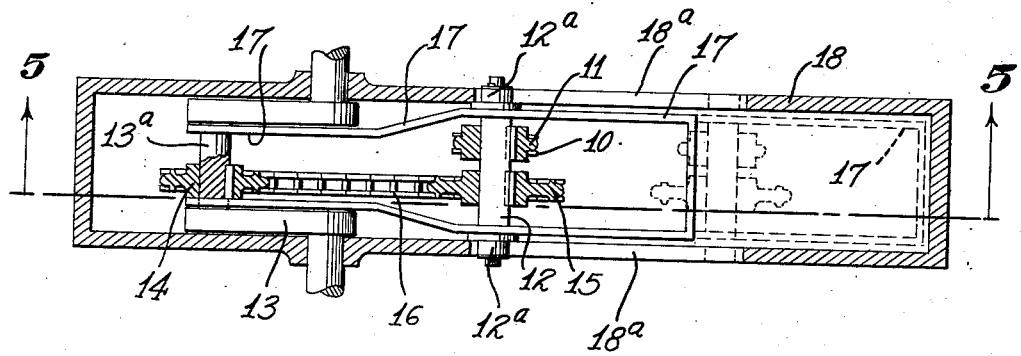
INVENTOR
Claude E. Bowers
A. B. Bowman
ATTORNEY Sept. 19, 1939.  C. E. BOWERS  2,173,546

METAL RECOVERING MEANS AND METHOD

Filed July 3, 1936  3 Sheets—Sheet 3

INVENTOR
Claude E. Bowers
BY
A. B. Bowman
ATTORNEY

Patented Sept. 19, 1939

2,173,546

UNITED STATES PATENT OFFICE 2,173,546

METAL RECOVERING MEANS AND METHOD

Claude E. Bowers, Los Angeles, Calif.

Application July 3, 1936, Serial No. 88,843

9 Claims. (Cl. 23—269)

My invention relates to a metal recovering means and method, more particularly to a means and method of removing galvanizing or other similar coatings from metal particles and recovering the metal coating materials and removal fluid residues, and the objects of my invention are:

First, to provide a means for thoroughly washing and agitating coated metal particles with removing fluids for removing the coating from the metals;

Second, to provide a means of this class with provision for washing the removing fluids from the metals while under agitation;

Third, to provide a means of this class with means in connection therewith for rotating and oscillating the agitating means;

Fourth, to provide a means of this class with special deflectors and partitions for turning and agitating the mass of metal coated particles while rotating and oscillating the means;

Fifth, to provide a means of this class which is particularly adapted for use in connection with an acid solution bath for removing zinc and similar coatings from metal particles;

Sixth, to provide a novel method of removing coatings from metal particles for recovering the metal;

Seventh, to provide such a method by which the metal coating residue may be recovered;

Eighth, to provide such a method whereby the metal removing fluid residue may be recovered;

Ninth, to provide a means and method of this class by the use of which all the coating may be removed from the metal coated particles and the particles thoroughly washed and cleansed thereafter in continuous operation;

Tenth, to provide a means of this class which is very simple and economical of production and operation, easy to operate, efficient in action, and which will not readily deteriorate or get out of order.

Figure 7:
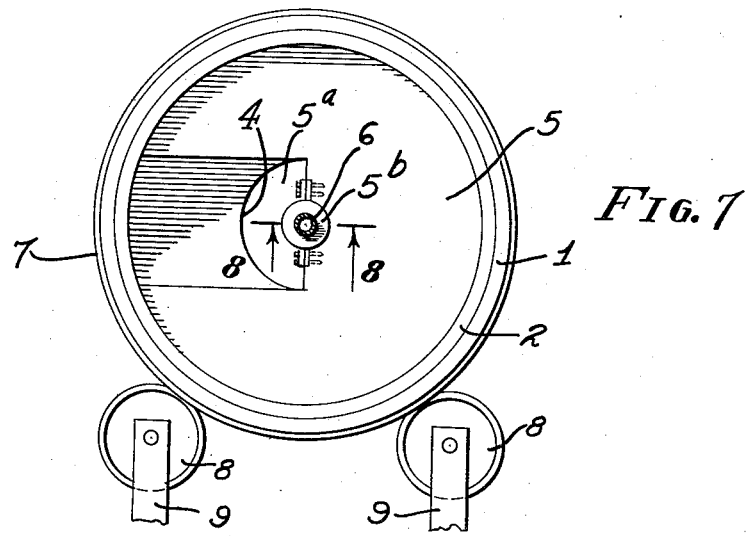
Figure 8:
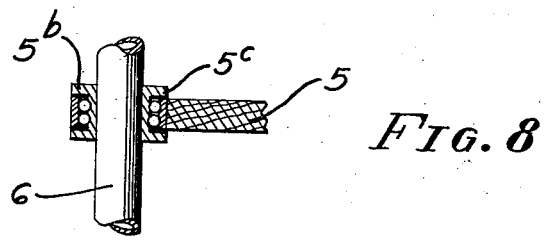
Figure 9:
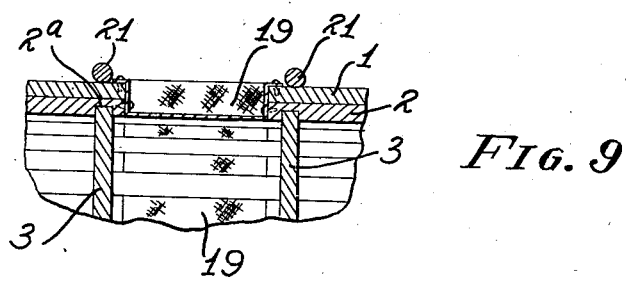

With these and other objects in view as will appear hereinafter my invention consists of certain novel features of construction, combination, and arrangement of parts and portions as will be hereinafter described in detail and particularly set forth in the appended claims, reference being had to the accompanying drawings and to the characters of reference thereon which form a part of this application in which:

Figure 1 is a longitudinal sectional view through the middle of my metal recovering means, showing some of the parts and portions in elevation to facilitate the illustration; Fig. 2 is a fragmentary sectional view at right angles to that of Fig. 1 from the line 2—2 of Fig. 1; Fig. 3 is an end view from the line 3—3 of Fig. 1; Fig. 4 is a fragmentary sectional view showing the cylinder turned a one-half revolution from that of Fig. 1 of the drawings; Fig. 5 is an enlarged sectional view of the cylinder and actuating mechanism from the line 5—5 of Figs. 1 and 6; Fig. 6 is a sectional view from the line 6—6 of Fig. 5 showing some of the parts and portions in elevation to facilitate the illustration; Fig. 7 is an end view of the discharge end of my metal recovering means; Fig. 8 is an enlarged fragmentary sectional view from the line 8—8 of Fig. 7, and Fig. 9 is an enlarged fragmentary sectional view from the line 9—9 of Fig. 1.

Similar characters of reference refer to similar parts and portions throughout the several views of the drawings:

The outer cylinder member 1, inner cylinder member 2, transverse partitions 3, deflectors 4, discharge head member 5, fluid conductor 6, track members 7, supporting wheels 8, upright supports 9, cylinder drive chain 10, sprocket 11, shaft 12, crank shaft 13, sprockets 14 and 15, chain 16, oscillating frame 17, frame 18, acid screens 19, water screens 20, and cylinder binding hoops 21, constitute the principal parts and portions of my metal recovering means.

The outer cylinder 1 consists of a plurality of staves fitted together into cylindrical form and bound together in the conventional manner by means of hoops 21. Immediately inside of this outer cylinder is a similar inner cylinder 2 which is held by the outer cylinder. This inner cylinder is provided with a series of spaced circular notches 2a in its inner surface in which are mounted the outer edges of the transverse partitions 3. These transverse partitions 3 are substantially circular but provided with a substantially rectangular opening 3a extending from the middle to the outer side at one side as shown best in Figs. 2 and 5 of the drawings, the one edge connecting with a deflector 4 as will be hereinafter described and leaving a semi-circular opening 3d for the passage of metal particles and recovery fluid therethrough. The head at the inlet end of the cylinder is, however, a complete circle 3b and provided with a central hole 3c while the discharge end is provided with a semi-circular opening 5a and in connection with this discharge head and the two next preceding partitions are provided with journal members 5b secured in the central edge of the partition and head as shown best in Figs. 1, 7, and 8 of the drawings providing roller bearings 5c between the journal members 5b and the partitions 3 and head 5 for permitting the ready revolving of the partitions 3 and cylinders 1 and 2 relative to the fluid conductors 6, which is a pipe which is secured to the journals 5b and is provided with perforations 6a at its inner end adapted to provide a supply of water introduced centrally into the agitated mass of metal particles after the coating has been removed and after the acid has been mostly drained from the particles.

Surrounding the perforate end of the pipe 6a are positioned a plurality of screens 20 consisting of fine mesh wire which replace each alternate stave between second and third partitions from the discharge end of the cylinder. These screens are substantially rectangular pan-shaped and set into both the outer and inner cylinders as shown best in Fig. 9 of the drawings and provide readily replaceable means for permitting the water from the pipe 6 to pass outwardly after passing through the agitating mass of decoated metals. Some distance further from the discharge end are provided a series of similar screens 19 which are for the purpose of draining the decoating acid from the cylinder, it being here noted that a small quantity of acid not drained during agitation at this point is washed out with the water through the screens 20 as the agitation of the mass of particles continues from and to the end of the cylinder.

Positioned between the partitions 3 and extending from one side of the opening 3a on one partition to the opposite side of the opening 3a in the adjacent partition are the agitating and turning deflectors 4, which are curved and warped so that they assume a reverse position at 180° as shown best in Figs. 1, 2, and 4 of the drawings so that the particles of metal are picked up and turned over several times between each pair of partitions 3 by the deflectors 4 in each revolution of the cylinder.

Encircling the outer cylinder 1 are a plurality of track members 7. (In this case I have shown three; one at the middle and one near each opposite end.) These track members are in the form of annular channels with their leg members extended outwardly and secured to the cylinders, and in these tracks are the supporting wheels 8 which are positioned in pairs and fit in the track members 7 and form the support upon which the cylinder rolls. These wheels 8 are journalled in uprights 9 in suitable spaced relation to properly support the cylinder in its revolution.

Also secured around the cylinder close to the middle is a sprocket 10a upon which is mounted a chain 10 for revolving the cylinder. This chain 10 is driven by means of a sprocket 11 which is secured on a shaft 12. Also secured on this shaft 12 is another sprocket 15 and in alignment therewith is another sprocket 14 mounted on the crank portion 13a of the crank shaft 13, and mounted on these sprockets 14 and 15 is a chain 16. The crank shaft 13 is driven by any power mechanism and in the revolution of said crank shaft the sprockets 14 and 15 are revolved, which in turn revolves the shaft 12 and sprocket 11 for revolving the cylinder 1.

Mounted in connection with the crank shaft 13 on the crank portion 13a is an oscillating frame 17 on which the shaft 12 is journalled by means of journal members 12a, which journal members 12a ride in grooves 18a in the frame 18 at opposite sides of said frame. These grooves 18a are made on an arc formed from the radius from the center of the cylinder so that when the crank shaft is in operation, the shaft 12 is shifted in this arc in a reciprocating movement caused by the revolution of the crank shaft 13. At the same time this shaft 12 is revolved carrying with it the cylinders. It will be noted, however, that with the backward movement of the shaft 12 in the slots 18a with a revolution of the crank shaft, there is a stoppage and reverse movement of the cylinder with each revolution of the crank shaft, thus providing an oscillating as well as revoluble movement of the cylinder. The cylinder moves in its forward direction approximately three times as far as it moves in its reverse or backward direction with each revolution of the crank shaft.

The operation of my metal recovering means is as follows: Scrap galvanized metal is placed in the entrance end of the cylinder 1 through the entrance end opening 3c from a chute or hopper of any conventional type together with galvanized coating removing solution such as is used for pickling including sulphuric acid, and the revolving and oscillation of the cylinder 1 causes the agitation of the coated metal particles in the form of scrap to be agitated, the deflectors 4 turning and tumbling these particles and at the same time deflecting them progressively from the space between two partitions to the space between the adjacent ones toward the discharge end. The cylinder is of sufficient length so that the acid will remove the coating during the movement from the entrance end to the compartment between partitions which carry the screens 19, at which place practically all of the acid is drained from the cylinder 1 through the screens 19 and recovered as a by-product such as zinc sulphate or iron sulphate or both. The mass then continues under agitation until it reaches the compartment with the screens 20 where the water is introduced in spray form at the middle through the conductor 6 and washes practically all of the remaining acid and water from the mass of metal particles from which is obtained by-products of some sulphuric acid water and zinc which forms zinc sulphate and iron sulphate which are recovered as well as the zinc. Then the metal progresses under agitation to further clean the water and acid from the metal particles which are discharged from the opening 5a. These metal particles are then placed in relatively large metallic containers which containers are placed in a furnace with the treated metal particles, and the whole including the container and metal particles are reduced to molten mass in the furnace and the molten mass treated in any conventional manner.

Though I have shown and described a particular construction, combination, and arrangement of parts and portions and certain method of recovering metal that has been coated, I do not wish to be limited to this particular construction, combination, and arrangement, nor to the method herein described, but desire to include in the scope of my invention, the construction, combination, and arrangement substantially as set forth in the appended claims.

Having thus described my invention, what I claim as new and desire to secure by Letters Patent is:

1. In a means of the class described, a cylinder provided with deflecting partitions from end to end, and means for automatically and continuously rotating said cylinder alternately certain distances in one direction and lesser distances in the opposite direction.

2. In a means of the class described, a cylinder provided with deflecting partitions from end to end, means for automatically and continuously rotating said cylinder alternately certain distances in one direction and lesser distances in the opposite direction, and an acid discharge screen positioned in the wall of said cylinder some distance from its discharge end.

3. In a means of the class described, a cylinder provided with deflecting partitions from end to end, means for automatically and continuously rotating said cylinder alternately certain distances in one direction and lesser distances in the opposite direction, an acid discharge screen positioned in the wall of said cylinder some distance from its discharge end, and a water and acid discharge screen in the wall of said cylinder intermediate said acid discharge screen and the discharge end of said cylinder.

4. In a means of the class described, a cylinder provided with deflecting partitions from end to end, means for automatically and continuously rotating said cylinder alternately certain distances in one direction and lesser distances in the opposite direction, an acid discharge screen positioned in the wall of said cylinder some distance from its discharge end, a water and acid discharge screen in the wall of said cylinder intermediate said acid discharge screen and the discharge end of said cylinder, and water inlet means positioned centrally at the discharge end of said cylinder and extending toward the entrance end of said cylinder adapted to introduce water into the screened section of said cylinder.

5. In a means of the class described, a cylinder provided with deflecting partitions from end to end, and means for automatically and continuously rotating said cylinder alternately certain distances in one direction and lesser distances in the opposite direction, said means including a crank shaft with a sprocket secured to its crank portion, a guide frame pivotally mounted on said crank portion, a shaft carried by said guide frame, sprockets secured on said shaft, a chain connecting one of said sprockets on said last mentioned shaft with the sprocket on the sprocket portion of said crank shaft and a chain connecting the other sprocket on said shaft with said cylinder, a framework supporting said crank shaft, an arcuate slot in said framework concentric with the circumference of said cylinder and guide means on said guide frame traveling in said arcuate slots.

6. In a metal recovering means, a cylinder provided with spaced partitions with open portions therein, deflectors connecting said partitions on opposite sides of said openings in the adjacent partitions, screens in the wall of said cylinder between two of said partitions some distance from the discharge end of said cylinder, other screens positioned in the wall of said cylinder between other partitions intermediate said first mentioned screens and the discharge end of said cylinder, means for introducing a washing solution on the interior of said cylinder adjacent said last mentioned screens, and means for automatically and continuously rotating said cylinder alternately certain distances in one direction and lesser distances in the opposite direction.

7. In a metal recovering means, a hollow cylinder provided with agitating and deflecting partitions therein, screens in longitudinal spaced relation to each other in the wall of said cylinder toward its discharge end, and crank shaft, chain, sprocket and guide means for automatically and continuously rotating said cylinder alternately certain distances in one direction and lesser distances in the opposite direction.

8. In a metal recovering means, a hollow cylinder provided with agitating and deflecting partitions therein, screens in longitudinal spaced relation to each other in the wall of said cylinder toward its discharge end, crank shaft, chain, sprocket, and guide means for automatically and continuously rotating said cylinder alternately certain distances in one direction and lesser distances in the opposite direction and means for introducing water near the discharge end of said cylinder adjacent one set of said screens.

9. In a means of the class described, a cylinder provided with deflecting partitions from end to end, means for automatically and continuously rotating said cylinder alternately certain distances in one direction and lesser distances in the opposite direction, said means including a crank shaft with a sprocket secured to its crank portion, a guide frame pivotally mounted on said crank portion, a shaft carried by said guide frame, sprockets secured on said shaft, a chain connecting one of said sprockets on said last mentioned shaft with the sprocket on the sprocket portion of said crank shaft, and a chain connecting the other sprocket on said shaft with said cylinder.

CLAUDE E. BOWERS.